US011431907B2

(12) United States Patent
Saito et al.

(10) Patent No.: US 11,431,907 B2
(45) Date of Patent: Aug. 30, 2022

(54) IMAGING DEVICE CAPABLE OF CORRECTING IMAGE BLUR OF A CAPTURED IMAGE AND CONTROL METHOD THEREFOR

(71) Applicant: CANON KABUSHIKI KAISHA, Tokyo (JP)

(72) Inventors: Mitsuhiro Saito, Kanagawa (JP); Kyosuke Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/176,960

(22) Filed: Feb. 16, 2021

(65) Prior Publication Data
US 2021/0258490 A1     Aug. 19, 2021

(30) Foreign Application Priority Data
Feb. 17, 2020 (JP) .............................. JP2020-024396

(51) Int. Cl.
*H04N 5/232*     (2006.01)
(52) U.S. Cl.
CPC ..... *H04N 5/23287* (2013.01); *H04N 5/23258* (2013.01)
(58) Field of Classification Search
None
See application file for complete search history.

(56) References Cited

U.S. PATENT DOCUMENTS 7,466,339 B2 * 12/2008 Usami ................ H04N 5/23248
                                                    348/148
8,699,868 B1 *  4/2014 Guenter ............. H04N 5/23218
                                                    396/55
(Continued)

FOREIGN PATENT DOCUMENTS

JP     2006170961 A   *  6/2006  ............. G01B 11/00
JP     2019-033408 A      2/2019

OTHER PUBLICATIONS

Watanabe, Shogo; JP2006170961A; Image Processor For Mounting On Vehicle, Extracts Range Of Oscillation Frequency With High Intensity To Acquire Balanced Image For Detecting Center Position Of Displacement; Jun. 2006; Google English Translation; pp. 1-7 (Year: 2006).*

*Primary Examiner* — Cynthia Segura
(74) *Attorney, Agent, or Firm* — Cowan, Liebowitz & Latman, P.C.

(57) ABSTRACT

In an imaging device, a first motion information acquisition unit acquires motion information of the imaging device, and a second motion information acquisition unit acquires motion information of an external device. A shake information generation unit performs a process of subtracting the motion information of the external device from the motion information of the imaging device on the basis of the acquired motion information of the imaging device and the external device. Image blur correction information is generated from the subtracted motion information. An image blur correction control unit performs driving control of a correction lens of an optical system and a movement mechanism unit of an imaging element in accordance with the image blur correction information from the shake information generation unit.

20 Claims, 11 Drawing Sheets

(56) References Cited

U.S. PATENT DOCUMENTS

| | | | |
|---|---|---|---|
| 2015/0207995 A1* | 7/2015 | Takagi | H04N 5/23258 |
| | | | 348/169 |
| 2015/0301607 A1* | 10/2015 | Saka | B60K 37/06 |
| | | | 345/175 |
| 2020/0098115 A1* | 3/2020 | Fukamachi | G06T 7/38 |
| 2021/0314491 A1* | 10/2021 | Sakurai | H04N 5/2253 |

* cited by examiner

IMAGING DEVICE CAPABLE OF CORRECTING IMAGE BLUR OF A CAPTURED IMAGE AND CONTROL METHOD THEREFOR

BACKGROUND OF THE INVENTION

Field of the Invention

The present invention relates to an image blur correction technique of correcting an image blur of a captured image caused by a camera shake or the like.

Description of the Related Art

In image blur correction of an imaging device such as a digital still camera, examples of methods of detecting a camera shake or the like include a method of using a shake detection sensor such as a gyro sensor and a method of using a motion vector of an image. In the method of using a shake detection sensor, motion information of the imaging device obtained from the shake detection sensor, that is, a motion component, is extracted, and control for driving an image blur correction member in a direction in which the motion component is cancelled is performed.

A case in which a photographer performs image capturing using an imaging device having an image blur correction function while on board a passenger car, a bus, or the like is assumed. A shake which is applied to the imaging device during the operation of a vehicle is a shake in which a camera shake caused by the photographer grasping the imaging device and a vibration occurring when the vehicle operates are synthesized. If the photographer performs image capturing in such a situation, the shake detection sensor mounted on the imaging device detects both the camera shake of the photographer and the vibration of the vehicle. Since the image blur correction member included in the imaging device is driven on the basis of a detection signal of the shake detection sensor, a captured image becomes an image in which the influences of the camera shake and the vibration of the vehicle are corrected. That is, if the photographer captures an image of a subject who is a fellow rider, the vibration of the vehicle is applied to the subject. For this reason, if image blur correction is performed on the vibration of the vehicle which is applied to the imaging device, an image blur caused by the vibration of the vehicle is reversely generated in the subject.

Accordingly, a technique of determining whether or not an object to be imaged is in the same vehicle and changing an image blur correction method is proposed. An imaging device disclosed in Japanese Patent Laid-Open No. 2019-33408 determines that the outside of a vehicle is being imaged if motion information obtained from a gyro sensor and motion information of a subject detected from the image are the same as each other, and determines that the inside of the vehicle is being imaged if both are different from each other. If it is determined that the imaging device is imaging the inside of the vehicle, an image blur correction process is performed using the motion information of the subject obtained from an image. It is possible to acquire an image in which optimum image blur correction is performed on each of subjects located inside and outside the vehicle.

In the technique of Japanese Patent Laid-Open No. 2019-33408, since the motion information of the subject is detected from a captured image, it is not possible to detect a motion in an exposure time during still image capturing, and to detect a high-frequency motion component that exceeds a frame rate. Further, there is a possibility of even the intentional motion of the subject being corrected during moving image capturing.

SUMMARY OF THE INVENTION

The present invention provides an imaging device that makes it possible to suppress image blur correction for a vibration of an external device and to acquire an image having an image blur corrected more satisfactorily if an image of a subject is captured within an external device such as a vehicle which is operating.

According to an embodiment of the present invention, there is provided an imaging device having a function of correcting an image blur of a captured image using an image blur correction unit, the imaging device including: an acquisition unit configured to acquire first motion information indicating a motion of the imaging device and second motion information indicating a motion of an external device including a vibration which is transmitted to the imaging device; a generation unit configured to perform a process of generating correction information for correcting the image blur of the captured image by performing a subtraction process of subtracting the second motion information from the first motion information; and a control unit configured to control the image blur correction unit using the correction information.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. In each embodiment, an imaging device having an image blur correction function is located within an external device. An example is shown in which a moving device such as a vehicle is illustrated as the external device and a photographer captures an image of a subject (a fellow rider) using the imaging device within the moving device.

First Embodiment

Figure 1:
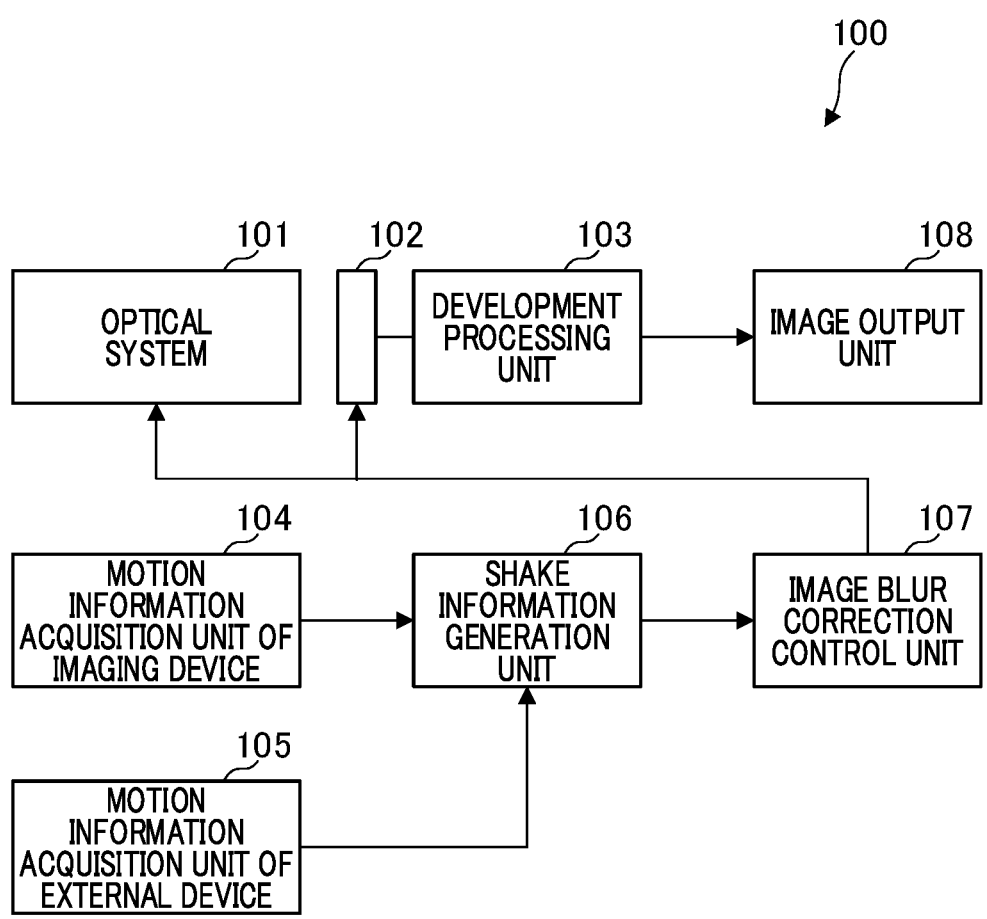
FIG. 1 is a block diagram illustrating a configuration of an imaging device of a first embodiment.

FIG. 1 is a block diagram illustrating a configuration of an imaging device 100 of the present embodiment. An optical system 101 is an imaging optical system that forms an image of light from a subject to form an image, and includes an optical member such as a lens group or a diaphragm. The optical system 101 includes a correction optical system for correcting an image blur of an image caused by a shake occurring in the imaging device.

An imaging element 102 is an image sensor such as a charged coupled device (CCD) sensor or a complementary metal oxide semiconductor (CMOS) sensor. The imaging element 102 performs photoelectric conversion on a subject image formed by the optical system 101 to output an electrical signal. A mechanism unit and a driving unit for moving the imaging element 102 are provided.

A development processing unit 103 acquires an electrical signal which is output from the imaging element 102 to generate a video signal. The development processing unit 103 includes an analog/digital (A/D) conversion circuit, an auto-gain control (AGC) circuit, an auto white balance (AWB) circuit, or the like, and outputs a digital signal. An imaging system that acquires an image is constituted by the imaging element 102 and the development processing unit 103.

A motion information acquisition unit 104 of the imaging device acquires information relating to the position and posture of the imaging device 100 using a shake detection sensor such as a gyro sensor. In addition, a motion information acquisition unit 105 acquires information relating to the position and posture of an external device. The external device is a device other than the imaging device, and is, for example, a vehicle such as a passenger car or a bus, a moving device such as a ship or an airplane, or a moving object in general. The external device transmits its vibration directly to the imaging device 100, or transmits it to the imaging device 100 through a photographer, a tripod, or the like.

A shake information generation unit 106 acquires motion information from the motion information acquisition units 104 and 105, and calculates a motion which is a target for image blur correction as shake information on the basis of the motion information of the imaging device and the external device. An image blur correction control unit 107 performs driving control of an image blur correction member (a correction lens) included in the optical system 101 and driving control of a mechanism unit that moves the imaging element 102, in accordance with an output of the shake information generation unit 106. A driven member is controlled so as to cancel the motion which is shake information calculated by the shake information generation unit 106, and information on an image having an image blur corrected is acquired. An example in which driving control of the correction lens is performed independently of or in collaboration with that of the movement mechanism unit of the imaging element is shown in the present embodiment, whereas there is an example in which only one of movement control of the correction lens and movement control of the imaging element is performed. An image output unit 108 outputs an image having an image blur corrected which is acquired from the development processing unit 103 to a display device to display it on a screen, or outputs image data to a storage device to store and hold it.

Figure 2:
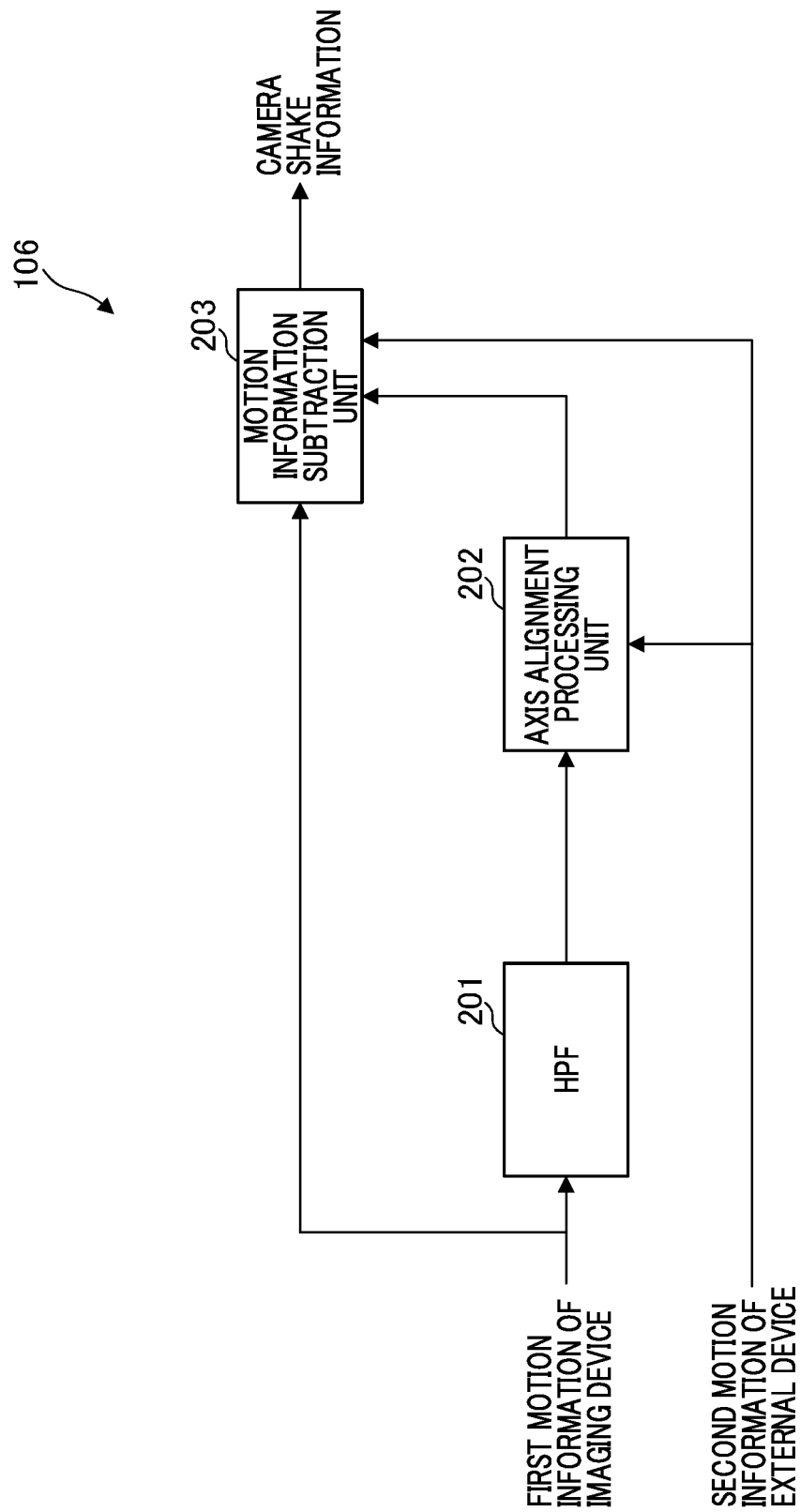
FIG. 2 is a block diagram illustrating a configuration of a shake information generation unit of the first embodiment.

FIG. 2 is a detailed configuration diagram of the shake information generation unit 106. The shake information generation unit 106 includes a high-pass filter (also denoted as an HPF) 201, an axis alignment processing unit 202, and a motion information subtraction unit 203.

The HPF 201 performs a high-pass filtering process on the motion information of the imaging device 100 which is acquired by the motion information acquisition unit 104, and extracts a high frequency component of the motion of the imaging device 100. The axis alignment processing unit 202 determines a difference in the relative orientation between the imaging device 100 and the external device on the basis of the output of the HPF 201 and the motion information of the external device, and performs an axis alignment process in order to reduce the difference. The motion information subtraction unit 203 performs a process of subtracting the motion information of the external device from the motion information of the imaging device 100, to thereby calculate information on a motion which is a target for image blur correction.

Figure 3:
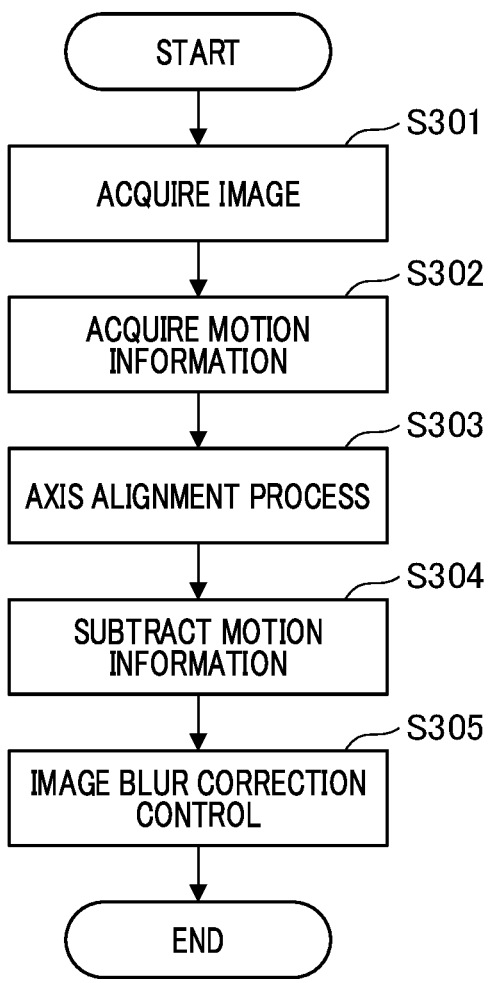
FIG. 3 is a flow chart illustrating operations of the imaging device of the first embodiment.

Processing which is performed by the imaging device 100 will be described with reference to the flowchart of FIG. 3. First, an image acquisition process is performed in S301. The imaging element 102 performs photoelectric conversion on a subject image formed by the optical system 101, and outputs an analog signal according to the luminance of the subject to the development processing unit 103. The development processing unit 103 generates a video signal by performing a predetermined process on the acquired analog signal. The predetermined process is an A/D conversion process, a correction process, or the like. The analog signal is converted into, for example, a 14-bit digital signal by an A/D conversion unit. Signal level correction or white level correction is further performed by an AGC circuit and an AWB circuit, and the digital video signal after the correction process is transmitted to the image output unit 108.

The imaging device 100 sequentially generates frame images at a predetermined frame rate in live-view display during moving image capturing and still image capturing in addition to still image capturing. The transmitted frame images are sequentially updated. A movable lens (such as a shift lens) of the image blur correction optical system included in the optical system 101 moves so as to cancel a shake occurring in the imaging device 100 to perform image blur correction. In addition, the imaging element 102 is moved by the mechanism unit that moves the imaging element 102 and thus the image blur correction is performed. That is, an image having an image blur corrected satisfactorily can be acquired by driving of the image blur correction member based on control information of the image blur correction control unit 107.

In S302 of FIG. 3, the motion information acquisition unit 104 acquires information indicating what kind of motion occurs in the imaging device 100 (hereinafter referred to as first motion information). For example, by using a gyro sensor which is mounted in the imaging device 100, it is possible to acquire angular velocity information of motions occurring in the imaging device 100 in a yaw direction, a pitch direction, and a roll direction. As another example related to the acquisition of the first motion information, there is a method of using an acceleration sensor which is mounted in the imaging device. It is possible to acquire acceleration information of motions occurring in the imaging device in a vertical direction, a left-right direction, and a front-rear direction.

In addition, in S302, the motion information acquisition unit 105 acquires information indicating a motion occurring in an external device (hereinafter referred to as second motion information). A vehicle which is an external device has various sensors for ascertaining its operation situation or surrounding situation mounted therein for the purpose of improving stability or comfort during its operation. For example, the imaging device 100 is connected wirelessly to an external device in a mobile communication system capable of transmitting and receiving high-speed and high-capacity data, and can freely acquire information from the sensors. In this case, the motion information acquisition unit 105 acquires detection data of the gyro sensor or the acceleration sensor which is mounted in the external device as the motion information of the external device. In another example related to the second motion information, it is possible to acquire and use detection information of a traveling operation state such as the steering angle of a vehicle or depression amounts of an accelerator and a brake.

Although a method of acquiring the second motion information from a sensor which is mounted in a vehicle exemplified as the external device has been described in the present embodiment, there is no limitation on the acquisition method. For example, there is an example in which motion information is acquired from a portable terminal device possessed by another person who is riding together in a vehicle that a photographer grasping the imaging device is on board. In this case, the portable terminal device can be wirelessly connected to the imaging device, and the second motion information can be acquired from the portable terminal device. Even if a vehicle does not have sensors capable of acquiring the motion information mounted therein, the motion information of the external device can be acquired. A motion of fluctuation or vibration occurring in a construction such as the upper portion of a large bridge or the upper floor of a building can be acquired as the second motion information. The first motion information and the second motion information acquired in S302 are transmitted to the shake information generation unit 106.

In S303, the shake information generation unit 106 performs the axis alignment process. The axis alignment processing unit 202 (FIG. 2) performs the axis alignment process related to the first motion information and the second motion information. The details of the axis alignment process will be described later with reference to FIG. 4.

In S304, the shake information generation unit 106 performs a process of subtracting motion information. The motion information subtraction unit 203 (FIG. 2) performs a process of subtracting the second motion information from the first motion information to generate shake information. In S305, the image blur correction control unit 107 calculates control information for driving the image blur correction member using the shake information generated by the shake information generation unit 106. The image blur correction control unit 107 performs driving control of the image blur correction member (the correction lens of the optical system 101 and the driving member of the imaging element 102) using the calculated control information.

Figure 4:
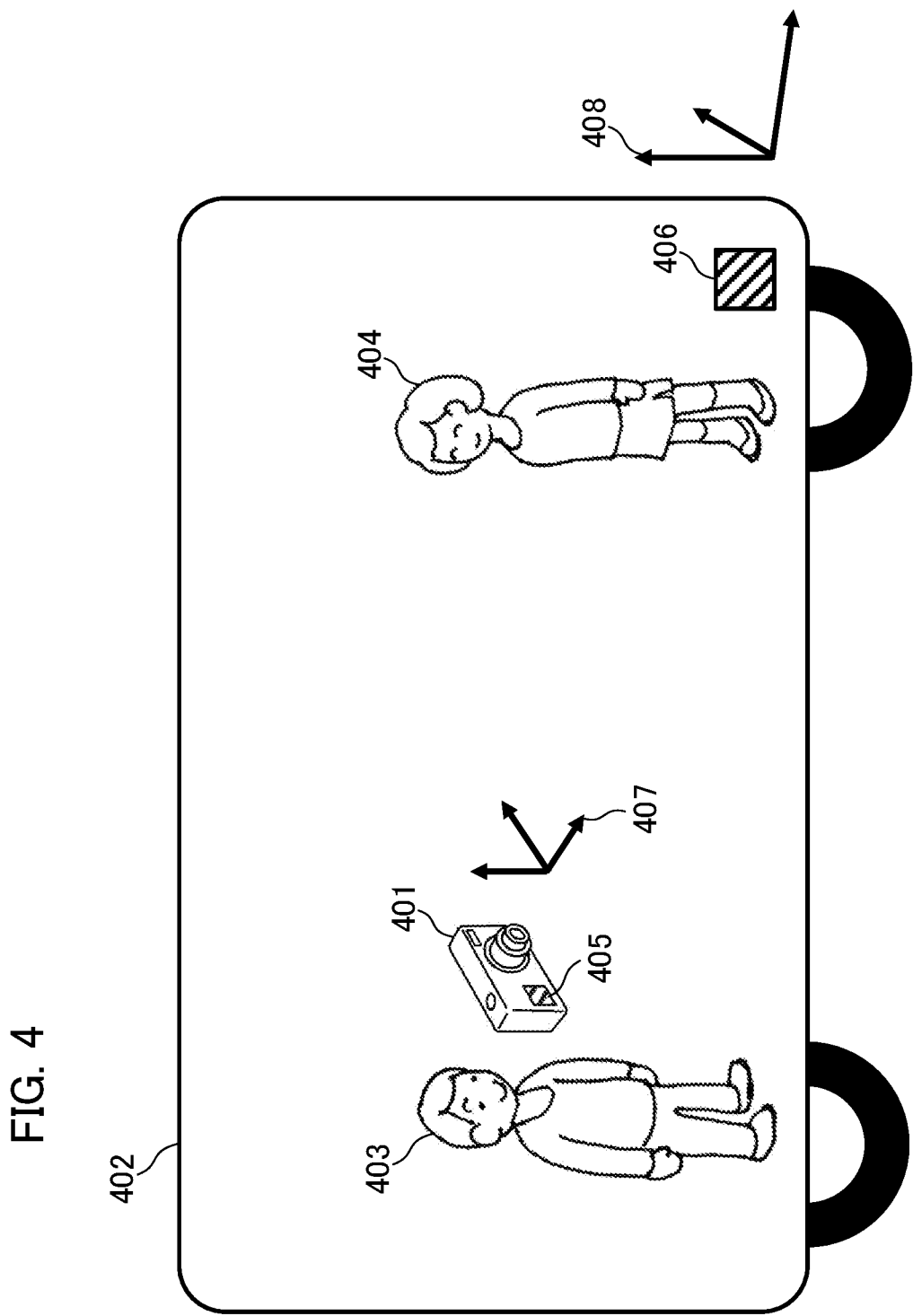
FIG. 4 is an overview diagram illustrating an axis alignment process.

The axis alignment process shown in S303 of FIG. 3 will be described with reference to FIG. 4. FIG. 4 is an overview diagram schematically illustrating an example in which a photographer 403 having an imaging device 401 captures an image of a subject 404 within a vehicle 402. The vehicle 402 represents a passenger car or the like which is a moving device.

It is assumed that the photographer 403 shown in FIG. 4 is on board the vehicle 402 with the imaging device 401 in his/her hand, and the vehicle 402 is traveling. In addition, the subject 404 is a fellow rider who is on board the vehicle 402 together with the photographer. A gyro sensor 405 for shake detection is mounted on the imaging device 401, and detects a motion occurring in the imaging device 401. In addition, a gyro sensor 406 is mounted in the vehicle 402, and detects a motion of the vehicle 402. It is assumed that, for example, as shown by three arrows, a three-dimensional orthogonal coordinate system 407 is set in the gyro sensor 405 of the imaging device 401. Angular velocity information in a yaw direction, a pitch direction, and a roll direction is detected with the three-dimensional orthogonal coordinate system 407 as a reference. This coordinate system 407 has its position and direction changed in accordance with the motion of the imaging device 401 on which the gyro sensor 405 is mounted.

On the other hand, it is assumed that, as shown by three arrows, a three-dimensional orthogonal coordinate system 408 is set in the gyro sensor 406 of the vehicle 402. The three-dimensional orthogonal coordinate system 408 is fixedly set in the vehicle 402, and has its position and direction changed in accordance with the motion of the vehicle 402.

Since the photographer 403 grasping the imaging device 401 can freely move within the vehicle 402, a relative positional relationship between the coordinate system 407 set in the imaging device 401 and the coordinate system 408 set in the vehicle 402 changes in accordance with the movement of the imaging device 401. The wording "a relative positional relationship between the coordinate systems changes" means that even if the same motion is applied to the imaging device 401 and the vehicle 402, the amount of motion with each coordinate system as a reference is detected. For example, a case in which the gyro sensor 405 of the imaging device 401 detects a motion in a yaw direction is assumed. In this case, the gyro sensor 406 of the vehicle 402 may detect a motion in a pitch direction or a roll direction instead of the motion in a yaw direction, or may detect a motion in which motions in a plurality of directions are mixed. If the same motion is applied to the imaging device 401 and the vehicle 402, a process that makes it possible to determine whether or not the same motion is detected from the gyro sensors 405 and 406 is required. That is, it is necessary to calculate the amount of shift of each axis in the coordinate systems 407 and 408 of the gyro sensors 405 and 406, correct the amount of shift, and align the direction of each axis.

As an example of an axis alignment method in each coordinate system, there is a method of using motion information which is detected from each gyro sensor in a state where the imaging device 401 is statically mounted at a predetermined place within the vehicle 402. First, by mounting the imaging device 401 at a predetermined place, it is possible to fix a relative positional relationship between the coordinate systems of the gyro sensors 405 and 406 of the imaging device 401 and the vehicle 402. The predetermined place is, for example, a jig for camera mount or the like which is installed on the dashboard inside the vehicle 402 or in the vehicle 402. After the imaging device 401 is statically mounted, motion information (a shake detection signal) is detected by the gyro sensors of both the imaging device 401 and the vehicle 402 in the traveling condition or idling state of the vehicle 402. The imaging device 401 uses the detected motion information of each axis to calculate the amount of shift required for matching the coordinate system 408 of the vehicle 402 with the coordinate system 407 of the imaging device 401 as the rotation angle of each axis. Here, the amount of motion detected in the coordinate system 408 of the vehicle 402 is denoted as a vector $M_v$. $M_v$ is represented by the following Expression (1).

$$M_v = [X_v Y_v Z_v]^T \qquad \text{[Expression 1]}$$

In Expression (1), $X_v$, $Y_v$, and $Z_v$ represent the amounts of movement in the directions of the X axis, the Y axis, and the Z axis, respectively, in the coordinate system 408. T represents a transposed matrix.

On the other hand, the amount of motion detected in the coordinate system 407 of the imaging device 401 is denoted as a vector $M_c$. $M_v$ is represented by the following Expression (2).

$$M_C = [X_C Y_C Z_C]^T \quad \text{[Expression 2]}$$

In Expression (2), $X_c$, $Y_c$, and $Z_c$ represent the amounts of movement in the directions of the X axis, the Y axis, and the Z axis, respectively, in the coordinate system 407.

The following Expression (3) is used for converting the vector $M_v$ which is the amount of motion detected in the coordinate system 408 of the vehicle 402 into the vector $M_c$ which is the amount of motion detected in the coordinate system 407 of the imaging device 401.

$$\begin{bmatrix} X_C \\ Y_C \\ Z_C \end{bmatrix} = \begin{bmatrix} \cos(\gamma) & \sin(\gamma) & 0 \\ -\sin(\gamma) & \cos(\gamma) & 0 \\ 0 & 0 & 1 \end{bmatrix} \begin{bmatrix} \cos(\beta) & 0 & -\sin(\beta) \\ 0 & 1 & 0 \\ \sin(\beta) & 0 & \cos(\beta) \end{bmatrix} \quad \text{[Expression 3]}$$

$$\begin{bmatrix} 1 & 0 & 0 \\ 0 & \cos(\alpha) & \sin(\alpha) \\ 0 & \sin(\alpha) & \cos(\alpha) \end{bmatrix} \begin{bmatrix} X_v \\ Y_v \\ Z_v \end{bmatrix}$$

In Expression (3), angles $\alpha$, $\beta$, and $\gamma$ represent the amounts of rotation around the X axis, the Y axis, and the Z axis, respectively, in the coordinate system 408 of the vehicle 402. The angles $\alpha$, $\beta$, and $\gamma$ are angles for matching the coordinate system 408 of the vehicle 402 with the coordinate system 407 of the imaging device 401. That is, by calculating the angles $\alpha$, $\beta$, and $\gamma$, it is possible to convert the motion information detected by the gyro sensor 406 of the vehicle 402 into the motion information detected by the coordinate system 407 of the imaging device 401.

As a method of calculating the angles $\alpha$, $\beta$, and $\gamma$, for example, there is a method of changing each of the three angles by a minute amount to calculate an amount of rotation such that $M_v$ and $M_c$ match as closely as possible. Other examples include a method of estimating an angle by using a statistical method such as the least squares method using motion information continuously acquired over a fixed period of time, and the like. If a relative positional relationship between the coordinate system in a state where the imaging device 401 is statically mounted in the vehicle 402 is obtained in advance using the above methods, the movement trajectory of the imaging device 401 can be calculated by integrating motion information acquired from the gyro sensor 405 thereafter. This makes it possible for the imaging device 401 to continue to ascertain a relative positional relationship between the coordinate systems 407 and 408 no matter how the photographer 403 moves the imaging device 401 within the vehicle 402.

In order to confirm whether or not a shift between the coordinate systems is satisfactorily corrected by the calculated angles $\alpha$, $\beta$, and $\gamma$, it is necessary for the motion information detected by the imaging device 401 and the vehicle 402 to be information detected on the basis of the same motion. However, in a case where results of conversion based on Expression (3) using the motion information detected by the imaging device 401 and the vehicle 402 are compared with each other as they are even if axis alignment is performed correctly at the angles obtained by the above-described method, the motion information does not match. This is because a motion which is applied to the vehicle 402 is only a motion concomitant with the operation of the vehicle, whereas a motion of a camera shake of the photographer 403 is further applied to the imaging device 401. That is, the second motion information is information on a motion concomitant with the operation of the vehicle 402, but the first motion information includes information on a motion concomitant with the operation of the vehicle 402 and information on a motion of a camera shake occurring due to the photographer 403 holding the imaging device in his/her hand. It is necessary to extract information on a motion concomitant with the operation of the vehicle 402 from the first motion information.

Generally, a vibration occurring concomitantly with the operation of a vehicle tends to contain a large amount of components having a relatively high frequency with respect to a motion such as a camera shake. Consequently, if information on a motion concomitant with the operation of the vehicle 402 is extracted from the motion information acquired by the gyro sensor 405 of the imaging device 401, the HPF 201 of FIG. 2 removes a low-frequency motion component from the first motion information which is detected by the imaging device. That is, information on a motion occurring concomitantly with the operation of a vehicle can be extracted from the first motion information, and an output of the HPF 201 is transmitted to the axis alignment processing unit 202. By using the motion information obtained in this manner, it is possible to confirm whether or not a process of matching a motion of the imaging device with a motion of the vehicle is performed with a predetermined accuracy through the axis alignment process for the coordinate system. As information of axis alignment, the amount of shift between the coordinate systems is held in a storage unit included in the imaging device as data of the magnitude of the rotation angle of each axis, and motion information in one coordinate system can be converted into motion information in the other coordinate system.

Without being limited to the axis alignment method in the coordinate system using data of the gyro sensor which is acquired in a state where the imaging device is statically mounted in the vehicle, another method may be used if a relative orientation relationship between the coordinate systems is known. For example, there is a method of using acceleration information acquired from acceleration sensors in triaxial directions which are mounted on the imaging device 401 and the vehicle 402. The acceleration information of the vehicle indicates a signal of a remarkable magnitude in a specific direction during acceleration and deceleration. Therefore, for example, a process of calculating the amount of rotation of the coordinate system such that directions in which the acceleration information obtained from the acceleration sensor indicates a remarkable magnitude match each other at the start, stop, or the like of the vehicle is executed. The axis alignment processing unit 202 (FIG. 2) calculates the rotation angle of each axis required for axis alignment of each coordinate system of the vehicle and the imaging device, and transmits the amount of axis alignment between the coordinate systems to the motion information subtraction unit 203.

Figure 5A:
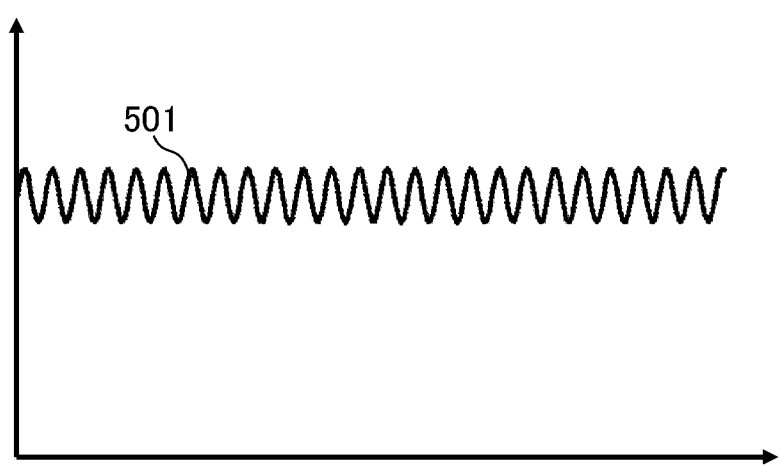
FIGS. 5A to 5C are schematic diagrams illustrating a process of subtracting motion information.
Figure 5B:
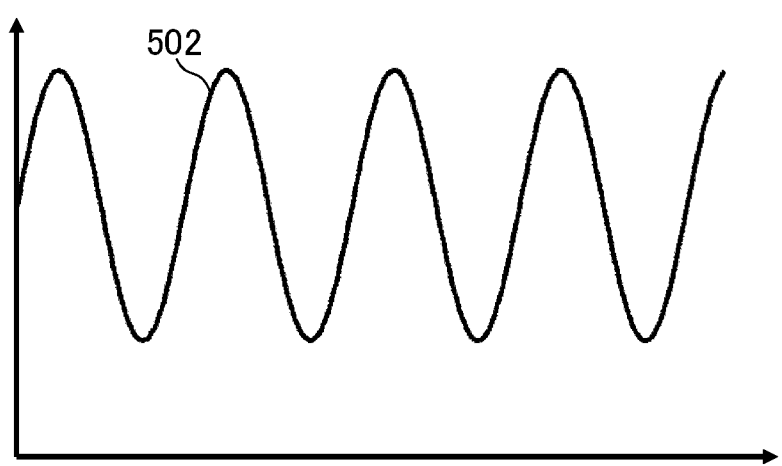
Figure 5C:
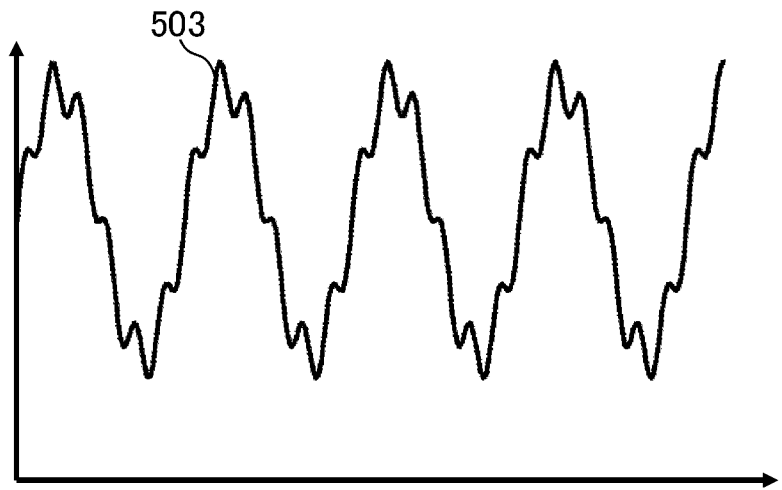

Next, processing performed by the motion information subtraction unit 203 will be described with reference to FIGS. 5A to 5C. FIG. 5A shows a temporal change in a motion of the vehicle, FIG. 5B shows a temporal change in a motion of a camera shake, and FIG. 5C shows a temporal change in a motion of the imaging device. In each graph of FIGS. 5A to 5C, the horizontal axis represents a time axis, and the vertical axis represents the magnitude of a motion. The motion information subtraction unit 203 subtracts the motion information of the vehicle 402 obtained by the motion information acquisition unit 105 from the motion information of the imaging device 401 obtained by the motion information acquisition unit 104. Meanwhile, it is assumed that the axis alignment process is performed on the motion information of the imaging device 401 and the motion information of the vehicle 402 by the axis alignment processing unit 202 on the basis of the amount of shift between the coordinate systems.

A graph line 501 of FIG. 5A schematically represents a motion of a vibration occurring in the vehicle 402. The amount of motion shown on the vertical axis represents, for example, angular velocity information which is obtained from the gyro sensor, or acceleration information which is obtained from the acceleration sensor. Each piece of detection information in triaxial directions is acquired in any case, but in the present embodiment, one axis in the coordinate system is shown for the purpose of simplifying the description.

A graph line 502 of FIG. 5B represents a motion of a camera shake occurring when the photographer 403 holds the imaging device 401. Since the photographer 403 is on board the vehicle 402, the motion detected by the gyro sensor 405 of the imaging device 401 is a motion obtained by synthesizing the motion of the vehicle 402 (see the graph line 501) and the motion of a camera shake (see the graph line 502). This motion is shown in FIG. 5C.

If the photographer 403 captures an image of the subject 404 who is a fellow rider of the vehicle 402, the same motion as the motion of the vehicle 402 is applied to the subject 404. In an image blur correction process of the related art, the motion detected by the gyro sensor 405 of the imaging device 401 is corrected as it is as a motion to be corrected. However, in a situation in which both the photographer 403 and the subject 404 are on board the same the vehicle 402, the motion of the vehicle 402 is generated on both sides. Here, a case in which both the motion of the photographer's camera shake occurring in the imaging device 401 and the motion of the vehicle 402 are corrected by an image blur correction process is assumed. This is equivalent to a situation in which the imaging device 401 is stationary whereas the subject 404 is moving by the amount of motion of the vehicle 402. Thus, blur caused by the motion of the vehicle 402 is generated in a subject in a captured image. In order to avoid this phenomenon, if the same motion is generated in both the photographer 403 and the subject 404, control in which the motion is not a target for image blur correction is required. That is, the motion information subtraction unit 203 subtracts the motion information acquired by the gyro sensor 406 of the vehicle 402 from the motion information acquired by the gyro sensor 405 of the imaging device 401. Thereby, since a motion which is a target for image blur correction is only the motion of a camera shake (see the graph line 502) shown in FIG. 5B, it is possible to appropriately perform the image blur correction. It is possible to suppress an increase in blurring of a subject image due to overcorrection caused by the correction of the motion of the vehicle 402 which did not originally need to be corrected. The shake information which is output by the motion information subtraction unit 203 is transmitted to the image blur correction control unit 107.

The image blur correction control unit 107 calculates control information for image blur correction using the shake information from the shake information generation unit 106. Driving control of the correction lens of the optical system 101 and a driving member that moves the imaging element 102 is performed in accordance with the calculated control information. The image blur correction control unit 107 performs a high-pass filtering process on a signal of the amount of motion corresponding to the shake information acquired from the shake information generation unit 106. This process is a process of cutting off a low-frequency component of a preset low-pass cutoff frequency or lower and outputting a high-frequency component that exceeds the low-pass cutoff frequency, among frequency components included in the signal of the amount of motion. Since a high-frequency motion which is a motion of a camera shake remains in the processed signal, the amount of correction equivalent to an amount for cancelling this motion is the amount of image blur correction. The image blur correction control unit 107 performs time integration on the amount of image blur correction, and the image blur correction member is driven on the basis of the integrated amount of correction. Thus, it is possible to acquire a captured image in which image blur correction is performed on the photographer's camera shake.

In the present embodiment, if the photographer boards an external device such as a vehicle and performs image capturing during the vehicle's operation, a process of subtracting the second motion information from the first motion information to calculate image blur correction information is performed. The second motion information can be acquired through a network environment or the like. Therefore, even if an image of the subject who is a fellow rider is captured, the motion of the external device does not become a target for image blur correction, and thus it is possible to acquire an image having a camera shake corrected satisfactorily.

Second Embodiment

Next, a second embodiment of the present invention will be described with reference to FIGS. 6 and 7. In the present embodiment, the same elements as those in the first embodiment are denoted by reference signs which are already used, and thus differences therebetween will be mainly described with the detailed description thereof omitted. Such a description omission method is also the same as that in an embodiment to be described later.

Figure 6:
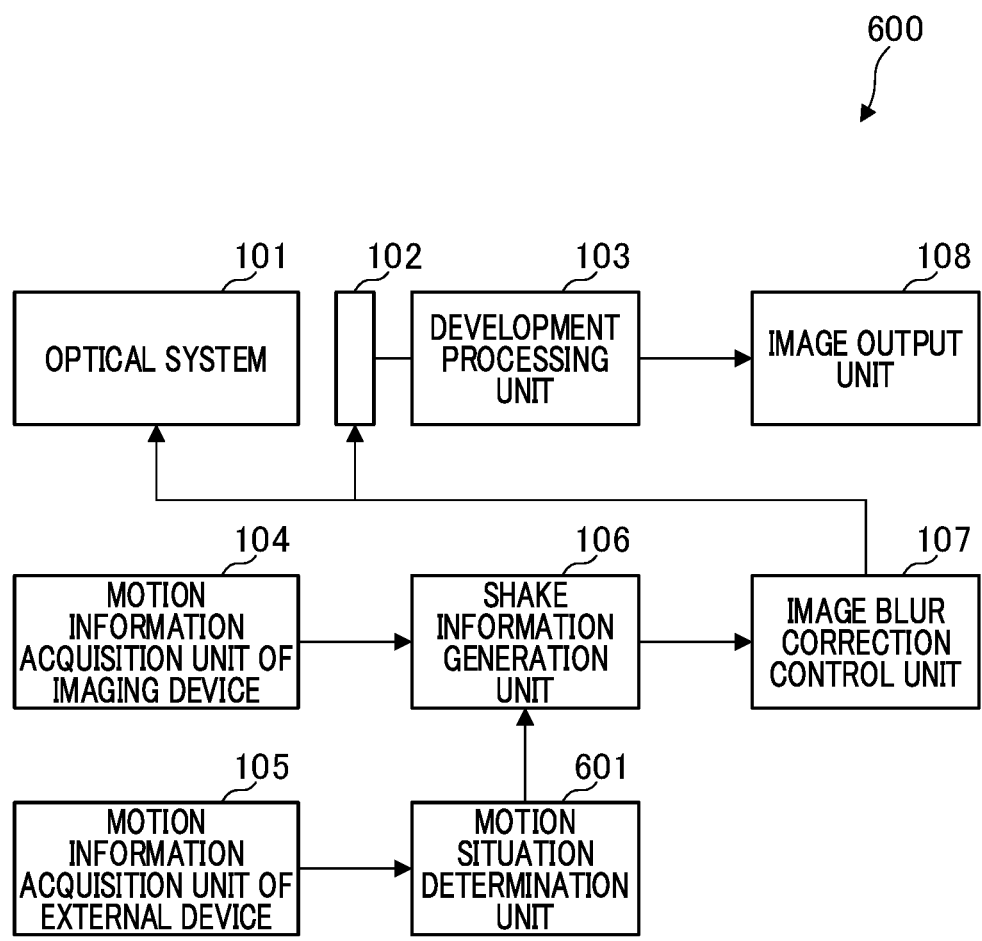
FIG. 6 is a block diagram illustrating a configuration of an imaging device of a second embodiment.
Figure 7:
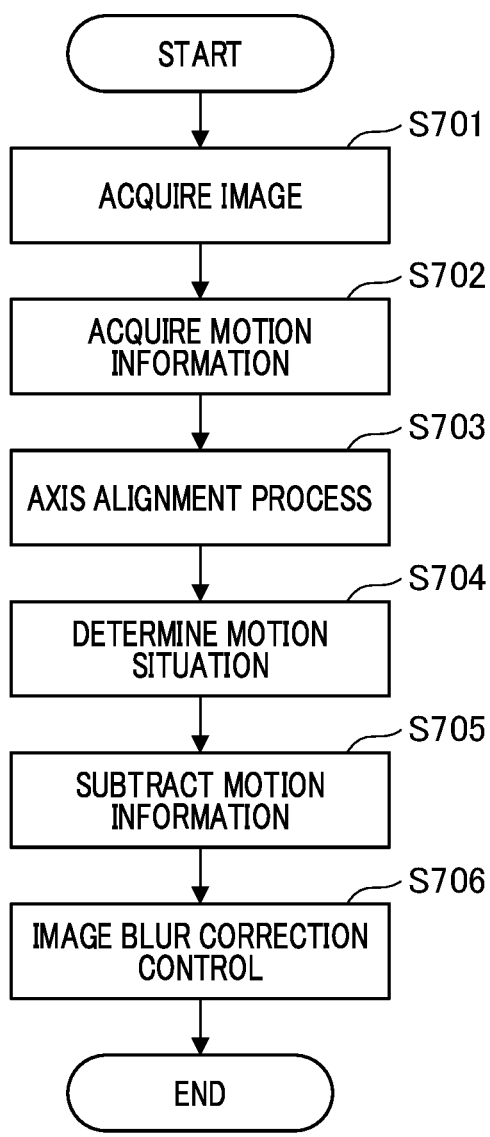
FIG. 7 is a flow chart illustrating operations of the imaging device of the second embodiment.

FIG. 6 is a block diagram illustrating a configuration of an imaging device 600 of the present embodiment. In FIG. 6, a motion situation determination unit 601 is added to the configuration of the first embodiment shown in FIG. 1. The motion situation determination unit 601 acquires the second motion information from the motion information acquisition unit 105 of the external device, and outputs a determination result for the motion situation of the external device to the shake information generation unit 106. The determination result has information for the shake information generation unit 106 to subtracting the motion information of the external device from the motion information of the imaging device on the basis of the motion situation of the external device and to determine whether or not to generate the shake information (correction information).

Processing in the present embodiment will be described with reference to the flow chart of FIG. 7. Since processes of S701, S702, and S703 shown in FIG. 7 are the same as the processes of S301, S302, and S303 in FIG. 3, respectively, the description thereof will not be given, and processes of S704 to S706 which are differences will be described.

Subsequently to S703, in S704, the motion situation determination unit 601 determines whether or not the motion information subtraction unit 203 executes a process of subtracting motion information on the basis of the motion information of the external device acquired by the motion information acquisition unit 105. A detailed description will be given with reference to the overview diagram of FIG. 4.

If a shake occurring in the vehicle 402 shown in FIG. 4 is large, the motion information subtraction unit 203 performs a subtraction process, and thus it is possible to acquire an image in which blur due to the motion of the vehicle is suppressed while satisfactorily correcting an image blur due to a camera shake. For example, a case in which the vehicle 402 travels on a road such as an unpaved mountain road or a gravel road is assumed. In this case, since a vibration which is applied to the vehicle 402 is very large, the effect of subtracting the motion information is very large. On the other hand, since a shake which is applied to the vehicle 402 is very small when the vehicle 402 is stopped or the like, there is a possibility of the subtraction process of the motion information bringing about an adverse effect. When the photographer 403 performs image capturing with the imaging device 401 held in his/her hand, the knees, hips, shoulders, and the like of the photographer 403 serve as a buffer action, that is, a cushion. Therefore, there is a possibility of a vibration applied from the vehicle 402 being absorbed by the human body if the vibration is minute. In this case, a motion of the vehicle 402 is not transmitted to the imaging device 401, and the gyro sensor 405 of the imaging device 401 cannot detect the motion. Therefore, if the motion information of the vehicle 402 is subtracted from the motion information of the imaging device 401 as described above, a motion that does not occur in the imaging device 401 becomes a target for image blur correction. For this reason, there is a possibility of an image with a large image blur in a vibrated state being acquired in the image blur correction process.

Consequently, the motion situation determination unit 601 of the present embodiment performs a determination process by comparing the magnitude of the motion information of the vehicle 402 acquired by the motion information acquisition unit 105 of the external device with a threshold determined in advance. That is, if it is determined that the magnitude of the second motion information is larger than the threshold, the motion situation determination unit 601 outputs the determination result to the shake information generation unit 106. In this case, in S705 of FIG. 7, the shake information generation unit 106 performs a process of subtracting the motion information in accordance with the determination result. In S706, the image blur correction control unit 107 performs image blur correction control in accordance with the output of the shake information generation unit 106. On the other hand, if it is determined that the magnitude of the second motion information is equal to or less than the threshold, the motion situation determination unit 601 outputs the determination result to the shake information generation unit 106. In this case, in S705 of FIG. 7, the shake information generation unit 106 does not perform a process of subtracting the motion information in accordance with the determination result. In S706, the image blur correction control unit 107 performs image blur correction control using the first motion information, that is, only the motion information of the imaging device 600 in accordance with the output of the shake information generation unit 106. Thereby, it is possible to acquire a captured image in which overcorrection in image blur correction based on the motion information of the external device is suppressed.

In addition, the imaging device 600 determines whether or not an intentional motion is included in the motion information in order to acquire an image having an image blur corrected more satisfactorily, and determines whether to perform a process of subtracting the motion information. For example, the motion of the imaging device 401 shown in FIG. 4 includes a motion of the imaging device caused by an intentional change operation of an imaging direction (such as panning or tilting) performed by the photographer 403, in addition to an unintentional motion of the photographer 403 such as a camera shake. If a camera shake is corrected with respect to the motion of the imaging device caused by an intentional operation of the photographer, it is necessary to perform image blur correction on only an unintended motion of the photographer, and not to perform correction on a motion such as panning. Since a motion intended by the photographer can be regarded mainly as a large motion of a low frequency, the image blur correction control unit 107 performs image blur correction control so that the amount of image blur correction caused by such a motion is not calculated.

As an example of the image blur correction control method, there is a method of dynamically changing the cutoff frequency of a high-pass filter for detecting the amount of camera shake in accordance with the start and end of panning (or tilting). If the start of panning is detected, a process of increasing the cutoff frequency of an HPF included in the image blur correction control unit 107 is performed. That is, a process is performed so that a motion of panning is not detected as a motion of camera shake. Thereafter, when it is detected that panning approaches the end, a process of lowering the cutoff frequency of the HPF is performed. That is, a process for enhancing the correction performance of camera shake as much as possible is performed. Although both correction of camera shake and control of panning are achieved by this method, there is a possibility of a phenomenon called a so-called shake return occurring. The shake return is a phenomenon in which the angle of view returns in a direction opposite to the direction of panning at the end of panning. The cause of the shake return is that a motion component of a low frequency is not limited by lowering the cutoff frequency of the HPF at the end of panning, and that a motion component in a direction opposite to the direction of panning appears in an output of the HPF. If panning ends completely and the motion of the imaging device has no motion component of a low frequency, the image blur correction member such as the correction lens returns to its initial position, and thus there is a possibility of the motion appearing as a motion of the shake return on an image.

If a motion of the shake return is generated with respect to a motion caused by an intentional operation of the photographer 403 in a situation of image capturing within the vehicle 402 shown in FIG. 4, there is a possibility of a motion when the vehicle 402 turns right or left being erroneously determined as an intentional motion of the imaging device 401 caused by the photographer 403. For example, a situation in which the vehicle 402 traveling on a winding road turns a corner while the photographer 403 captures an image of the inside of the vehicle is assumed. Even if the photographer 403 brings the imaging device 401 to a standstill with it held in his/her hand and performs image capturing, a motion of the shake return occurs suddenly. In order to avoid the occurrence of such a phenomenon, the motion situation determination unit 601 determines whether or not the vehicle 402 is changing its course using the motion information of the vehicle 402 which is acquired by the motion information acquisition unit 105. If it is determined that the vehicle 402 is changing its course, the motion information subtraction unit 203 performs the subtraction process regardless of the magnitude of the motion of a vibration occurring in the vehicle 402. This makes it possible to suppress the occurrence of a motion of shake return arising from the result that the motion of the vehicle 402 is erroneously recognized as a motion caused by an intentional operation of the imaging device 401 during a change of a traveling direction such as a right turn or a left turn.

A determination method related to the motion of the vehicle 402 during a change of its course will be described below. If the magnitude of the motion information (the amount of shake detection) acquired by the gyro sensor 405, for example, exceeds a first threshold determined in advance, the motion situation determination unit 601 determines that panning has been started. The vibration of the vehicle 402 during straight traveling is a minute vibration of a high frequency, whereas the motion at the time of a right or left turn is very large. Therefore, it can be determined that the motion of a right or left turn has been started from a point in time at which the magnitude of the motion information acquired by the gyro sensor exceeds a second threshold (larger than the first threshold) determined in advance. In addition, the motion situation determination unit 601 compares the magnitude of the motion information acquired from the gyro sensor at a point in time later than a point in time at which the start of a right or left turn is determined with a third threshold determined in advance, in an end determination process for the motion of a right or left turn of the vehicle 402. When the magnitude of the motion information becomes equal to or less than the third threshold, it is determined that a right or left turn ends. Meanwhile, such a method of determining a right or left turn of a vehicle is merely an example. Examples of other methods include a method of comparing a differential value of angular velocity which is output by the gyro sensor, that is, an angular acceleration, with a predetermined threshold to determine the result, and the like, and there is no particular limitation insofar as the method can detect a right or left turn of a vehicle. Further, there area method of acquiring and determining steering information of a vehicle, as motion information, instead of an output of the gyro sensor, a method of acquiring video information of a vehicle-mounted camera to determine the video information using image analysis, and the like.

The imaging device of the present embodiment determines what kind of motion the external device is doing, and determines whether to perform a process of subtracting the motion information on the basis of the determination result. By suppressing the occurrence of overcorrection or erroneous determination in the image blur correction process, it is possible to acquire an image in which satisfactory image blur correction is performed on a camera shake of a photographer if image capturing is performed with a traveling vehicle, or the like.

Third Embodiment

Figure 8:
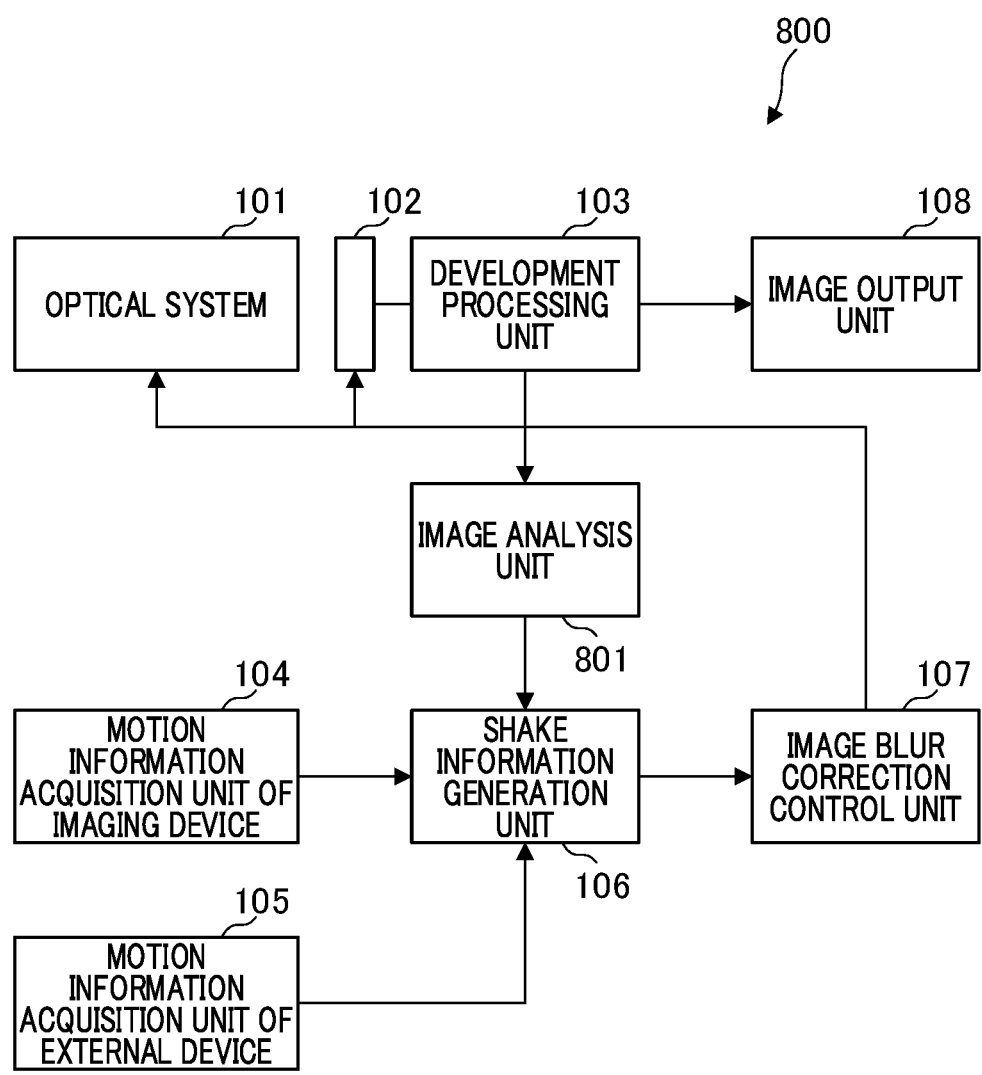
FIG. 8 is a block diagram illustrating a configuration of an imaging device of a third embodiment.

Next, a third embodiment of the present invention will be described with reference to FIGS. 8 to 11. FIG. 8 is a block diagram illustrating a configuration of an imaging device 800. In the present embodiment, an image analysis unit 801 is added to the configuration of the imaging device 100 shown in FIG. 1. The image analysis unit 801 acquires image information from the development processing unit 103, and outputs image analysis information indicating an image analysis result to the shake information generation unit 106.

Figure 9:
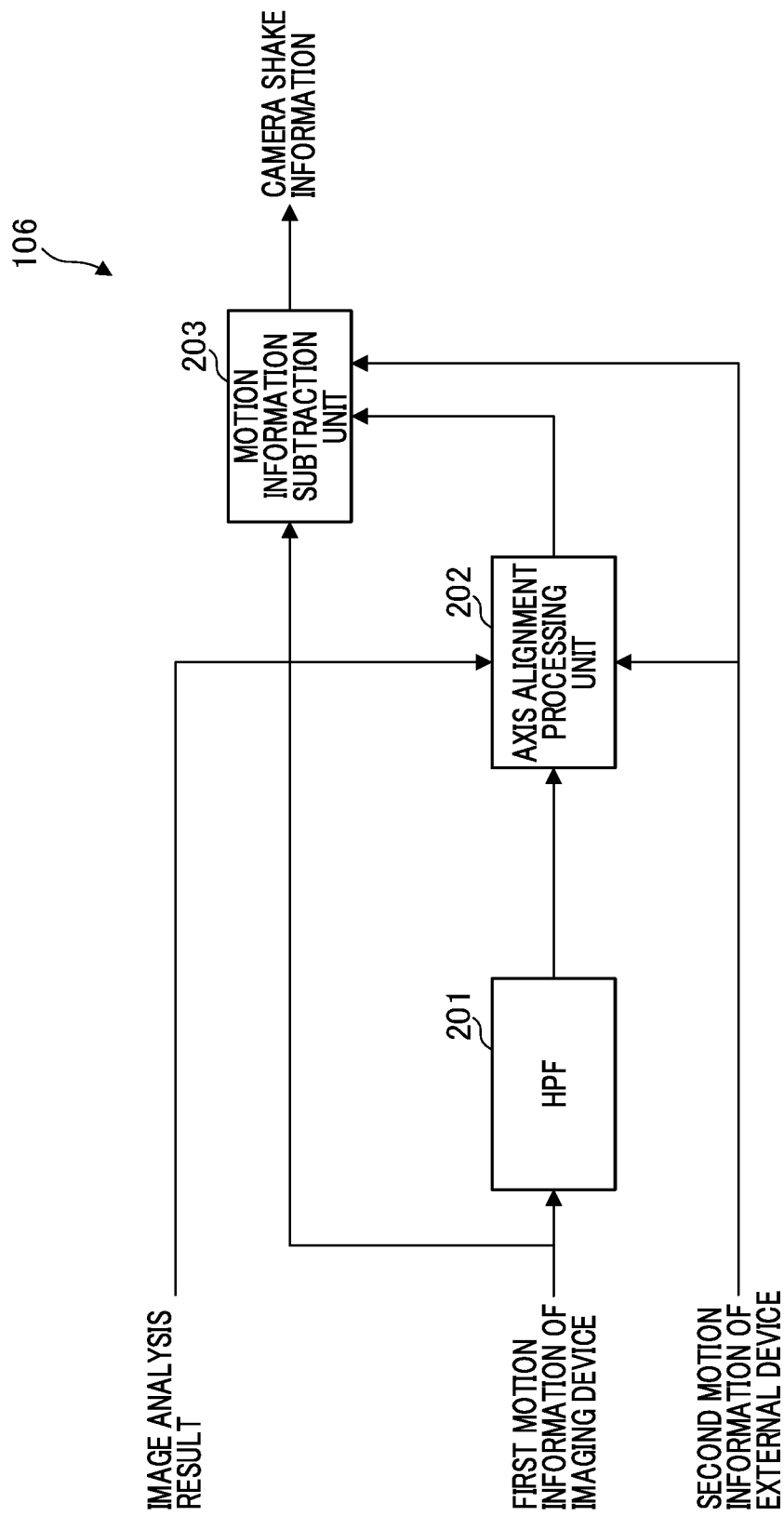
FIG. 9 is a block diagram illustrating a configuration of a shake information generation unit of a third embodiment.

FIG. 9 is a block diagram illustrating an internal configuration of the shake information generation unit 106 of the present embodiment. The difference from FIG. 2 is that the axis alignment processing unit 202 executes a process using image analysis information of the image analysis unit 801.

In the present embodiment, a process based on the image analysis information of the image analysis unit 801 is performed in addition to the processes described in the first embodiment. In the image analysis unit 801, if it is determined that capturing an image of a subject influenced by the vibration of the external device is performed by the imaging device 800, shake information is generated by subtracting the motion information of the external device from motion information of the imaging device 800. The axis alignment processing unit 202 determines whether or not to generate the shake information by subtracting the motion information of the external device from the motion information of the imaging device on the basis of the motion information of the external device and the image analysis information.

Figure 10:
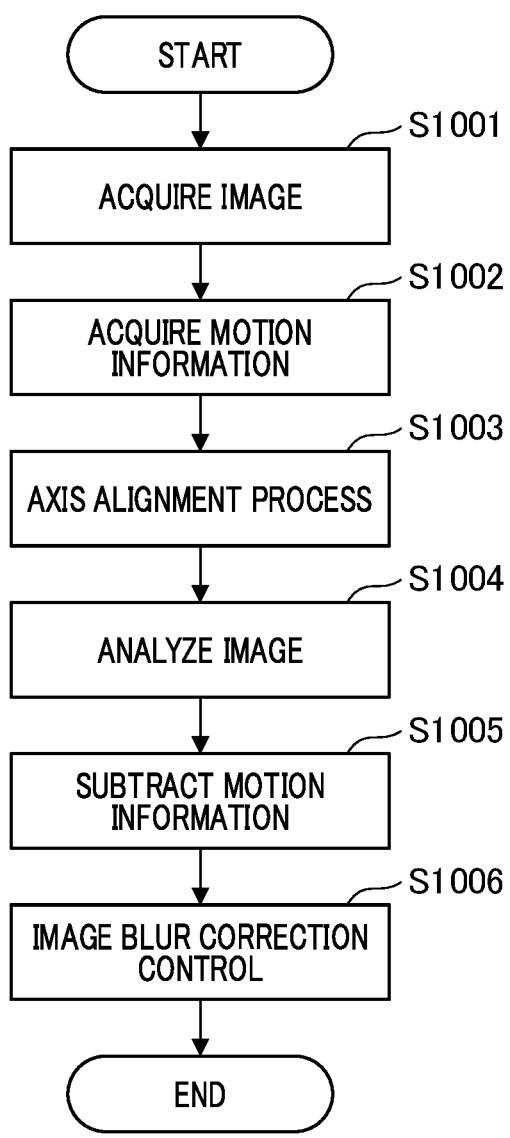
FIG. 10 is a flow chart illustrating operations of the imaging device of the third embodiment.

Processes (S1003 to S1005) different from those in FIG. 3 in the present embodiment will be described with reference to the flow chart of FIG. 10. The processes of S1001, S1002, and S1006 shown in FIG. 10 are the same as the processes of S301, S302, and S305 in FIG. 3. In addition, description will be given with reference to FIGS. 4 and 5.

In S1003 of FIG. 10, the axis alignment processing unit 202 performs axis alignment between the coordinate system 407 of the gyro sensor 405 mounted on the imaging device 401 and the coordinate system 408 of the gyro sensor 406 mounted in the vehicle 402. In addition to the method described in the first embodiment as the axis alignment method, a method based on an output of the image analysis unit 801 will be described below.

The image analysis unit 801 uses the image information obtained from the development processing unit 103 to calculate an amount of correction for performing axis alignment on the coordinate system. First, a process of capturing an image of a reference subject inside the vehicle 402 is performed using the imaging device 401. The term "reference subject" refers to equipment of a vehicle such as charts or markers on which geometric figures are drawn, a rearview mirror, or a seat. Insofar as the magnitude, shape, and installation position of the reference subject are already known, there is no particular limitation. Information relating to the magnitude, shape, and installation position of the reference subject is assumed to be stored in advance in a storage unit (not shown) included in the imaging device 401.

Next, the image analysis unit 801 analyzes how an imaged reference subject is reflected in a captured image. For example, there is an analysis method of using feature points detected from the image region of the reference subject in the captured image. A process of determining which of the feature points of the image of the reference subject stored in the storage unit of the imaging device 401 each of a plurality of feature points detected from the reference subject in the captured image corresponds to is executed. By performing a statistical process using a correspondence relation between the plurality of feature points to estimate camera external parameters of the imaging device 401, it is possible to know the position and direction where the imaging device 401 has captured an image of the reference subject. Further, it is assumed that a process of measuring a positional relationship between the position and posture of the reference subject and the coordinate system 408 of the gyro sensor 406 included in the vehicle 402 in advance is performed. Thereby, it is possible to know a relative positional relationship between the coordinate system 408 of the gyro sensor 406 and the coordinate system 407 of the gyro sensor 405. After the relative positional relationship between the coordinate systems 407 and 408 is determined, the movement trajectory of the imaging device 401 is continued to be calculated. Thus, even if the photographer 403 freely moves the imaging device 401, it is possible to always ascertain a change in the relative positional relationship between the coordinate systems 407 and 408.

A method of calculating the movement trajectory of the imaging device is not particularly limited, and a general method can be used. There are, for example, a method of continuously accumulating the motion information acquired from the gyro sensor or the acceleration sensor included in the imaging device, a method of estimating a change in the position and posture of the imaging device by extracting a feature point group from a captured image and tracking the extracted feature point group, and the like. In addition, the movement trajectory of the imaging device is calculated using live-view video during still image capturing, and is calculated using live-view video or video for recording during moving image capturing. Meanwhile, the live-view video is a video which is sequentially displayed on the screen of a display unit during image capturing, and the video for recording is a video corresponding to data recorded in a predetermined recording medium.

In S1004 of FIG. 10, the image analysis unit 801 determines whether the photographer 403 is attempting to capture an image of the inside or the outside of the vehicle 402. It is determined whether or not the process of subtracting the motion information of the imaging device 401 is performed on the basis of the determination result. The method described in the embodiment is a method for acquiring a captured image in which image blur correction is performed satisfactorily when the photographer 403 boarding the traveling vehicle 402 captures an image of the inside of the vehicle. In this method, if the photographer 403 attempts to capture an image of scenery outside of the vehicle through the window of the vehicle 402 instead of the inside of the vehicle, there is a possibility of a large image blur occurring. A detailed description will be given with reference to FIG. 5.

A graph line 503 of FIG. 5C represents a temporal change in a motion which is detected by the gyro sensor 405 mounted on the imaging device 401 held by the photographer 403 in his/her hand. This motion is equivalent to a motion obtained by adding the motion of camera shake of the photographer 403 to the motion of the vehicle 402. On the other hand, the motion of the vehicle 402 shown by the graph line 501 of FIG. 5A occurs in the subject 404 who is a fellow rider within the vehicle. On the other hand, no motion is applied to a subject outside the vehicle insofar as the subject itself is stationary. Therefore, if the photographer 403 captures an image of the subject outside the vehicle from inside the vehicle with the imaging device 401, and a process of subtracting the motion information of the vehicle 402 from the motion information of the imaging device 401 is assumed to be performed, the subtracted motion becomes a target for image blur correction. A camera shake is corrected in the captured image, but there is a possibility of blur caused by the vibration of the vehicle 402 occurring. Consequently, in the present embodiment, it is determined whether the photographer 403 captures an image of the inside of the vehicle or captures an image of the outside of the vehicle with the imaging device 401. If it is determined that the photographer 403 captures an image of the outside of the vehicle with the imaging device 401, the process of subtracting the motion information of the imaging device 401 is not performed.

As a method of determining whether the photographer 403 captures an image of the inside of the vehicle or an image of the outside thereof with the imaging device 401, a method of using image analysis information will be described in the present embodiment. The image analysis unit 801 first detects the amount of motion between a plurality of images which are temporally continuously acquired from the development processing unit 103. A method of detecting the amount of motion between images includes a template matching method, a gradient method, and the like. There is no particular limitation in the case of a method that can calculate to which coordinate value in the other image a pixel having any coordinate value in an image moves. A specific example of motion detection will be described with reference to FIG. 11.

Figure 11:
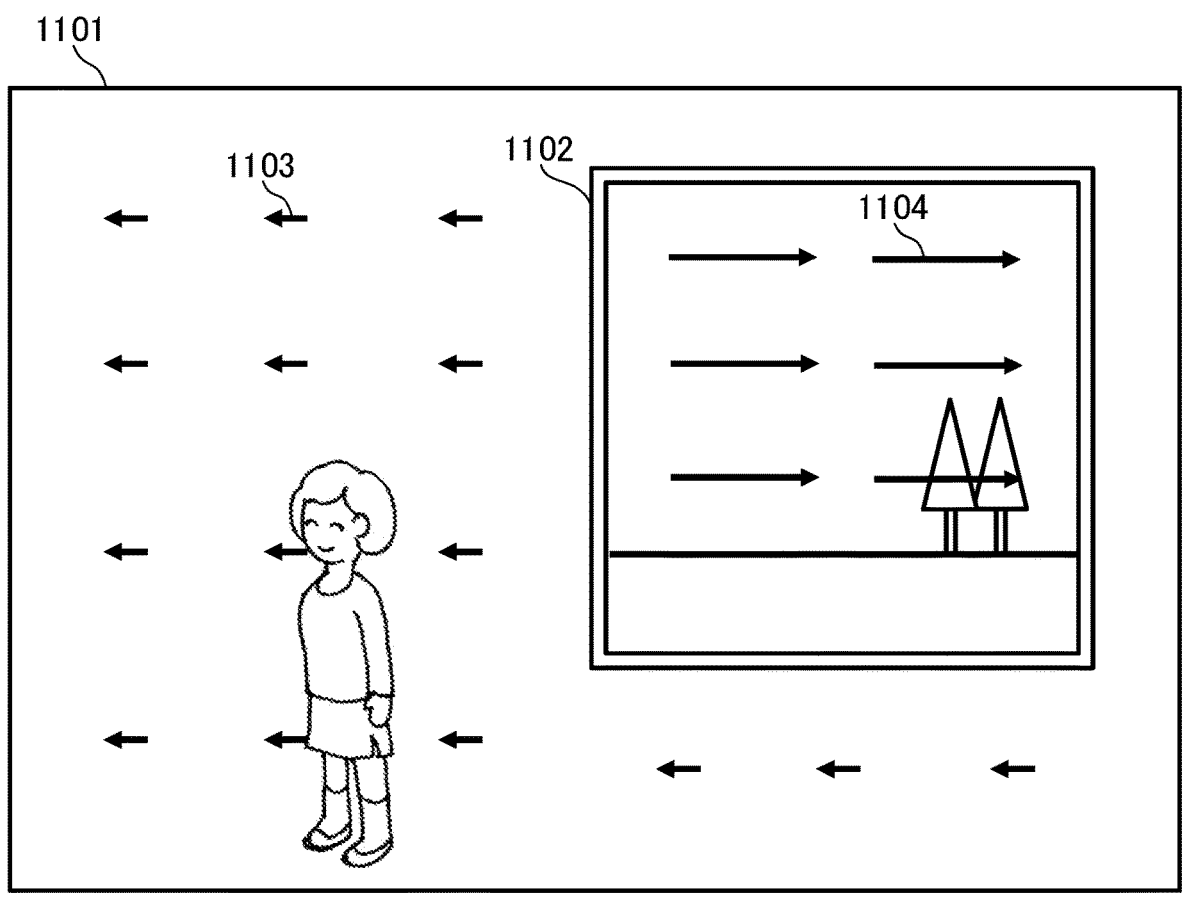
FIG. 11 is a schematic diagram illustrating an example of a detection result of a motion vector.

FIG. 11 is a schematic diagram illustrating an example of an image 1101 captured inside the vehicle 402 by the imaging device 401. A rectangular region 1102 within the image 1101 represents a vehicle window, and a region other than the rectangular region 1102 represents a region inside the vehicle such as an interior part. An arrow group 1103 and an arrow group 1104 schematically represent detected amounts of motion as motion vectors. The arrow group 1103 represents the amount of motion of a region inside the vehicle, and the arrow group 1104 represents the amount of motion of scenery outside of the vehicle seen from the vehicle window.

In FIG. 11, the traveling direction of the vehicle 402 is defined as a left direction. A relative speed between the vehicle 402 and the photographer 403 on board the vehicle is substantially zero, and the magnitude of the motion vector (the arrow group 1103) detected from the region inside the vehicle becomes as small a motion as a camera shake. On the other hand, the magnitude of the motion vector (the arrow group 1104) detected from the region outside the vehicle is a large amount according to the traveling speed of the vehicle 402, and the direction of the motion vector is opposite to the traveling direction. In this manner, there is a difference in motion vectors detected in the regions inside and outside the vehicle 402. If pieces of motion information are compared with each other using this, it can be determined whether the imaging device 401 captures an image of the inside or the outside of the vehicle. That is, since the relative speed between the vehicle 402 and the photographer 403 is small, the motion information acquired from the gyro sensor 406 of the vehicle 402 and the motion information acquired by image analysis have approximate values. For example, in the image analysis unit 801, the amount of motion slightly larger than a camera shake is set as a threshold in advance. The image analysis unit 801 calculates a difference between the amount of motion acquired from the gyro sensor 406 of the vehicle 402 and the magnitude of the motion vector detected from the captured image. If the calculated difference is equal to or less than the threshold, the image analysis unit 801 determines that the detected motion vector is a motion vector detected from the region inside the vehicle in the image. In addition, if the calculated difference is larger than the threshold, the image analysis unit 801 determines that the detected motion vector is a motion vector detected from the region outside the vehicle in the image.

Further, the image analysis unit 801 determines whether each of motion vectors detected from a plurality of regions in an image is detected from the region inside or outside the vehicle. The image analysis unit 801 determines that a region in which more vectors are detected is a region (region to be imaged) which is imaged by the photographer 403 with the imaging device 401.

In addition, as another determination method, there is a method of determining whether the imaging device 401 captures an image of a subject inside or outside the vehicle by analyzing where a region of interest is in an image. As a method of determining a region of interest in an image, there is, for example, a method of defining a region where a focus frame (focus state detection frame) in autofocus (AF) control is located as a region of interest. Since it is very likely that a subject region focused by the photographer is a region of interest, the region of interest can be reliably determined. In addition, there are a method of detecting information on the photographer's visual line using a visual line detection device to determine a region of interest, a method of determining a region of interest using a result of processing a subject's face identification, and the like.

In S1005 of FIG. 10, the motion information subtraction unit 203 performs a process of subtracting the motion information of the vehicle 402 which is an external device from the motion information of the imaging device 401 on the basis of the determination result. Thereby, it is possible to calculate the amount of satisfactory image blur correction with respect to motion information which is a target for image blur correction.

In recent years, various sensors have also been mounted in general passenger cars from the viewpoint of safety or comfort. In large-sized vehicles such as buses, trains, ships, and the like, sensors capable of detecting their motions may be mounted at a plurality of positions. In such a case, when the methods described above are implemented, there is a problem caused by using a sensor installed at a position far away from the imaging device. That is, a difference in the way of motion of each sensor at the installation place or a time difference in which the motion is transmitted may serve as an error factor, and thus there is a possibility of the accuracy of image blur correction lowering. In order to solve such a problem, there is a method of ascertaining a positional relationship between the imaging device and a plurality of sensors installed in the vehicle and using a sensor located at a position closest to the imaging device. If the sensor located at the shortest distance from the imaging device is used, substantially the same motion is simultaneously applied to the imaging device and the sensor. In order to ascertain a positional relationship between the imaging device and each sensor, it is only required that the method described in S1004 of FIG. 10 is used. That is, a process of measuring a positional relationship in advance between a plurality of sensors is performed. By calculating an amount indicating a positional relationship between the imaging device and any one of the plurality of sensors, it is possible to ascertain positional relationships with the other sensors on the basis of this positional relationship. The shake information generation unit 106 performs the subtraction process using motion information which is acquired from a sensor located at a position where a relative distance to the imaging device is close among a plurality of pieces of motion information acquired by the motion information acquisition unit 105 from the plurality of sensors.

In addition, there is a method of selecting a sensor mounted at a position in front of the imaging device 401 in the traveling direction of the vehicle 402 from the plurality of sensors included in the vehicle 402. It is possible to improve the accuracy of calculation by calculating the amount of image blur correction in consideration of a delay time which is taken until a motion detected by the selected sensor is transmitted to the imaging device 401.

For example, in the case of a vehicle equipped with tires, since a shock received by the tires from the road surface is transmitted as a vibration, there is a time difference before the rear wheels receive the shock received by the front wheel due to a stepped difference or the like. If a sensor that detects a vibration is installed in front of the imaging device in the traveling direction of the vehicle, the imaging device detects a motion after the sensor detects the motion of the vehicle. The imaging device and the sensor of the vehicle are connected wirelessly to each other, and the motion information of the vehicle is instantaneously transmitted to the imaging device. Therefore, if the subtraction process is performed using the transmitted motion information as it is, the process of subtracting the motion information is executed with a time lag equivalent to the amount of the delay time of motion detection, and thus the amount of satisfactory image blur correction cannot be calculated. Consequently, as a method of measuring a delay time, a process of storing motion information of both the imaging device and the vehicle for a certain period of time is first performed. Next, in a pattern matching process related to time-series data of a motion, a process of calculating the degree of coincidence of the motion information is performed while shifting little by little in a time-axis direction. The amount of shift when the degree of coincidence of the motion information becomes the highest is held in the storage unit as a delay time. The delay time is measured periodically at a timing when the photographer does not perform image capturing, or is measured at a timing when it is determined that the imaging device has moved significantly in the vehicle. It is possible to measure a correct delay time at all times by appropriately setting the timing of measurement. The delay time is measured by the shake information generation unit 106.

In S1005 of FIG. 10, when the motion information of the vehicle 402 is subtracted from the motion information of the imaging device 401, the motion information subtraction unit 203 shifts the motion information in a time-axis direction by the amount of delay time calculated in the above method and then performs the subtraction process. Thereby, since it is possible to reduce an error caused by a time difference between a timing at which the sensor included in the vehicle 402 detects a motion and a timing at which the imaging device 401 detects a motion, the amount of more satisfactory image blur correction can be calculated.

In the present embodiment, an image which is acquired by the imaging device is analyzed, and the axis alignment process or the subtraction process according to the situation of image capturing is performed on the basis of the image analysis information. Since the amount of image blur correction corresponding to various situations can be calculated, it is possible to acquire an image having an image blur corrected satisfactorily in image capturing in a vehicle which is operating.

The imaging device having an image blur correction function according to the embodiment receives, for example, a shake detection signal from a sensor mounted in a vehicle or the like and uses the signal in an image blur correction process. It is possible to acquire information of the vibration of the vehicle at a high sampling rate at any timing including an exposure period during still image capturing. In addition, it is possible to execute the image blur correction process without being influenced by an intentional motion of a subject during moving image capturing. When an image of a subject riding together in a vehicle which is operating is captured, the correction of a motion caused by the vibration of the vehicle which does not need to be corrected gives rise to the possibility of an image blur due to the motion occurring. Consequently, it is possible to acquire an image having an image blur corrected more satisfactorily by suppressing the correction of a motion of the vehicle influencing the subject.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-0243%, filed Feb. 17, 2020, which is hereby incorporated by reference wherein in its entirety.

What is claimed is:

1. An imaging device having a function of correcting an image blur of a captured image using an image blur correction unit, the imaging device comprising
at least one processor and a memory holding a program that makes the processor function as:
an acquisition unit configured to acquire first motion information indicating a motion of the imaging device in which a relative motion between the imaging device and an external device is superimposed on a motion of the imaging apparatus in response to a vibration transmitted to the imaging device from the external apparatus, and second motion information indicating a motion of the external device;
a generation unit configured to perform a process of generating third motion information indicating a relative motion between the imaging device and the external device based on the second motion information and from the first motion information; and
a control unit configured to control the image blur correction unit based on the third motion information.

2. The imaging device according to claim 1, wherein the acquisition unit includes a first acquisition unit configured to acquire the first motion information from a first detection unit configured to detect motions in a plurality of directions related to the imaging device and a second acquisition unit configured to acquire the second motion information from a second detection unit configured to detect motions in a plurality of directions related to the external device, and
the generation unit performs an axis alignment process for aligning axes of a plurality of coordinate systems which are set in directions of motions with respect to the first and second motion information.

3. The imaging device according to claim 2, wherein the generation unit includes a filtering unit configured to extract a high-frequency component from the acquired first motion information and a processing unit configured to acquire an output of the filtering unit and the second motion information and perform the axis alignment process, and
the generation unit performs the axis alignment process and then performs the subtraction process.

4. The imaging device according to claim 2, wherein the generation unit performs the axis alignment process on the first and second motion information acquired in a state where the imaging device is statically mounted in the external device.

5. The imaging device according to claim 2, wherein the first acquisition unit acquires the first motion information from the first detection unit configured to detect angular velocity or acceleration of the motions in the plurality of directions related to the imaging device, the second acquisition unit acquires the second motion information from the second detection unit configured to detect angular velocity or acceleration of the motions in the plurality of directions related to the external device, and the generation unit performs the axis alignment process using information of the acquired angular velocity or acceleration.

6. The imaging device according to claim 1, wherein the processor further functions as:
a determination unit configured to determine a situation of the motion of the external device, and
wherein the generation unit determines whether or not to generate the third motion information by performing the subtraction process of the second motion information from the first motion information in accordance with a result of determination related to the situation of the motion of the external device which is performed by the determination unit.

7. The imaging device according to claim 6, wherein, if the determination unit determines that a magnitude of the motion of the external device is larger than a threshold, the generation unit generates the correction information by performing the subtraction process.

8. The imaging device according to claim 6, wherein, if the determination unit determines that the external device is changing its traveling direction, the generation unit generates the correction information by performing the subtraction process.

9. The imaging device according to claim 6, wherein the determination unit determines the situation of the motion of the external device from the second motion information, steering information of the external device, or video information of an imaging unit mounted in the external device.

10. The imaging device according to claim 1, wherein the processor further functions as:
an analysis unit configured to analyze a captured image which is acquired by the imaging device, and
wherein the control unit determines whether or not to control the image blur correction unit based on the third motion information by performing the subtraction process using image analysis information of the analysis unit.

11. The imaging device according to claim 10,
wherein the analysis unit determines by analyzing whether or not a subject of the imaging device is a subject to which the vibration of the external device is transmitted, and
wherein, if the analysis unit determines that the subject of the imaging device is a subject to which a vibration of the external device is transmitted, the control controls the image blur correction unit based on the third motion information.

12. The imaging device according to claim 11, wherein the subject to which the vibration of the external device is transmitted is a subject that is present inside the external device.

13. The imaging device according to claim 10,
wherein the analysis unit determines by analyzing whether or not a subject of the imaging device is a subject to which the vibration of the external device is transmitted, and
wherein, if the analysis unit determines that the subject of the imaging device is a subject to which a vibration of the external device is not transmitted, the control unit controls the image blur correction unit based on the first motion information.

14. The imaging device according to claim 10, wherein the analysis unit determines whether or not a subject of the imaging device is a subject to which the vibration of the external device is transmitted by analyzing a region of interest of a captured image.

15. The imaging device according to claim 10, wherein the analysis unit uses image information acquired by an image sensor to calculate an amount of correction used for axis alignment in a plurality of coordinate systems which are set in directions of motions with respect to the first and second motion information, and
the generation unit acquires the amount of correction based on the image analysis information of the analysis unit to perform an axis alignment process on the coordinate systems.

16. The imaging device according to claim 15, wherein the generation unit determines a direction of the imaging device with respect to the external device from a position and direction of a subject in a captured image acquired by the analysis unit to perform a process of aligning a direction of each axis of the plurality of coordinate systems.

17. The imaging device according to claim 1, wherein the acquisition unit acquires the first motion information from a first detection unit configured to detect a vibration of the imaging device, and acquires the second motion information from a second detection unit configured to detect a vibration of the external device, and when the second motion information is subtracted from the first motion information, the generation unit calculates a delay time from a point in time at which the vibration of the external device is detected by the second detection unit to a point in time at which the vibration is detected by the first detection unit, and generates the third motion information based on the first motion information, the second motion information, and the calculated delay time.

18. The imaging device according to claim 1, wherein the acquisition unit acquires the second motion information from a plurality of detection units configured to detect the motion of the external device, and
the generation unit compares a position of a first detection unit located at a first distance to the imaging device with a position of a second detection unit located at a second distance closer to the imaging device than the first distance among the plurality of detection units, acquires the second motion information based on a detection result of the second detection unit.

19. The imaging device according to claim 1, wherein the imaging device is located inside the external device which is moving,
wherein the relative motion is the motion of the imaging device in the external device.

20. A control method which is executed by an imaging device having a function of correcting an image blur of a captured image using an image blur correction unit, the control method comprising:
acquiring first motion information indicating a motion of the imaging device in which a relative motion between the imaging device and an external device is superimposed on a motion the imaging apparatus in response to a vibration transmitted to the imaging device from the external apparatus, and second motion information indicating a motion of the external device;
performing a process of generating third motion information indicating a relative motion between the imaging device and the external device based on the second motion information and from the first motion information; and
controlling the image blur correction unit based on the third motion information.

* * * * *